Figure 1:
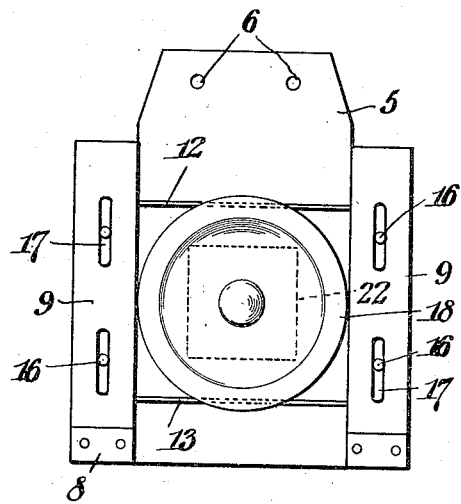

July 29, 1924.

A. MOORE

LAMP SUPPORT

Filed May 11, 1923

1,502,866

Arthur Moore, INVENTOR.

BY Dwight B Gain
ATTORNEY

Patented July 29, 1924.

1,502,866

UNITED STATES PATENT OFFICE.

ARTHUR MOORE, OF CHANUTE, KANSAS.

LAMP SUPPORT.

Application filed May 11, 1923. Serial No. 638,186.

*To all whom it may concern:*

Be it known that I, ARTHUR MOORE, a citizen of the United States, residing at Chanute, county of Neosho, State of Kansas, have invented certain new and useful Improvements in Lamp Supports, of which the following is a specification.

This invention relates generally to lamp supports or brackets, and has particular reference to means for supporting the tail or rear light of motor vehicles.

The primary object of the invention is to provide a bracket or support for the tail light which will hold the same in proper position at all times, and in such manner as to overcome the possibility of breaking of the light or the filament thereof due to shocks or jars to which the vehicle is subjected in travel over rough roads.

A further object of the invention is to provide a light support or bracket of construction as to enable the same to be readily applied to the motor vehicle without necessitating any changes in the rear arrangement of the vehicle, or in the light wiring thereof.

A further object is to provide a lamp bracket which may be easily and cheaply manufactured, which is composed of but few simple and readily assembled parts, which parts are so constructed and arranged as to minimize the opportunity for wear, breakage or derangement of the same, which maintains the lamp in proper position at all times, and which will prove highly practical and efficient in use.

With these objects in view, together with others which will appear as the description proceeds, the invention consists in the novel construction, combination and arrangement of parts, all as will be described more fully hereinafter, illustrated in the drawings, and particularly pointed out in the claims.

Figure 2:
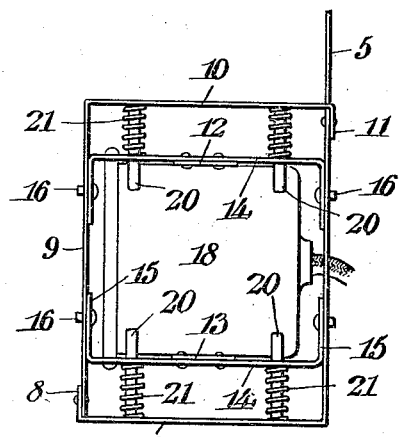
Figure 3:
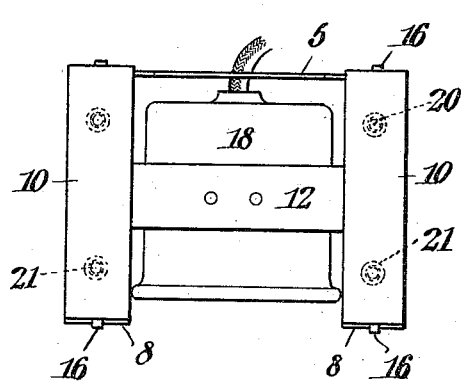
Figure 4:
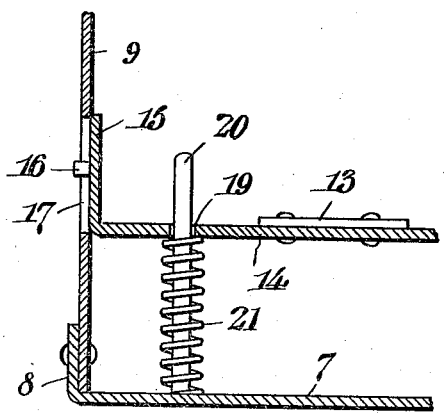

In the drawings:

Fig. 1 is a front view of the bracket constructed in accordance with the invention, with a conventional type of lamp applied thereto, Fig. 2 is a side elevation of the improved bracket, Fig. 3 is a plan view of the bracket, and Fig. 4 is an enlarged fragmentary view in section, taken through a portion of the bracket and the movable frame therein.

The invention consists generally in the provision of a bracket or body to be firmly affixed to the body or running gear frame of the motor vehicle, and within which is a resiliently supported light or lamp carrying frame. This frame is preferably movable in a vertical plane, and is yieldably opposed in both its upward and downward movements. The resilient devices used in this connection are sufficiently stiff to resist severe jolts and jars without danger of damage to the bracket or frame, and yet possess proper and adequate resiliency to cushion the lamp.

The herein disclosed bracket and parts show a preferred means for carrying forth the inventive idea, but it is apparent that changes in the details of construction and assemblage of the parts may be resorted to without departing from the spirit of this invention.

In the drawings, the bracket includes a rear plate 5 formed preferably of thin light metal, of a gage to insure strength and rigidity, and which is adapted to be attached to the rear of the vehicle. This attachment may be carried out by passing bolts, screws or other fastening members through the openings 6 near the upper edge of the plate and into the vehicle body or chassis.

The plate 5 has a pair of bars or plate sections 7 extending forwardly from its lower edge, one of said bars at each end of the plate, and these plates are disposed at right angles to the plate 5. The sections are of equal length, and are turned up at their extreme ends as at 8, to form or provide attaching portions for the lower ends of the bracket bars 9.

The bracket bars 9 extend upwardly from the elements 8, parallel with the plate 5, to a point near the upper edge of the said plate, whereupon they extend rearwardly at right angles to provide top members 10, parallel with the sections 7. The extreme rear ends of the bars 9—10 extend downwardly as at 11 and engage over a a suitable shoulder formed upon the plate 5. The portions 11 are riveted or bolted to the rear face of the plate 5, as shown, and it is apparent from this construction that an extremely rigid bracket is formed.

Associated with this bracket is a light or lamp supporting frame, yieldably movable in a vertical plane within the said bracket. This frame comprises upper and lower portions 12 and 13, which portions comprise bars disposed laterally of the bracket, and to the ends of which are secured right-angularly extending arms 14. These arms have their ends turned inwardly at right angles to form bearing surfaces or portions 15 to engage and bear against the inner faces of the upright portions 5 and 9 of the bracket. The length of these arms, therefore, is substantially equal to the distance between the portions 5 and 9. The upper and lower portions 12 and 13 and their respective arms may be formed of one piece of metal stamped in the form shown or they may be made up of separate parts, as the drawings indicate, and bolted or riveted together to provide a rigid structure.

Each of the inturned portions 15 of the frame is provided with an outwardly disposed stud or pin 16 to engage or ride in slots 17 formed in the plate 5 and bar 9 of the bracket; these slots being disposed longitudinally of the said plate and bars.

A familiar type of tail light is indicated at 18, and is secured within the frame between the upper and lower portions 12—13 of the frame. The lamp may be riveted, bolted or clamped between the members 12—13, and serves as a connector for these members.

Each of the arms 14 is provided with a pair of spaced openings 19 (see Fig. 4) to loosely receive posts 20 rigidly secured at their inner ends to the parts 7 and 10 of the bracket. Each of these posts has coiled therearound a spring 21, resting at their inner ends against the parts 7 and 10 of the bracket, and exerting pressure against the arms 14 of the frame. The power of these springs will be equal, so that the pressure exerted, both upwardly and downwardly, will be equalized, and the frame will be yieldably movable in directions both upwardly and downwardly.

The wiring necessary in the lamp connection may pass out of the frame bracket rearwardly through an opening 22 formed in the plate 5, or this wiring may be led from the bracket in any other suitable way.

From the foregoing, it will be apparent that the lamp 18 rigidly carried between the members 12—13 of the frame will be yieldably supported within the bracket, and will be cushioned effectively against shocks to which the bracket is subjected. Violent bounds and rebounds encountered by a vehicle to which the bracket is attached will be compensated for by the springs between which the lamp is suspended, and these springs will effectively absorb vibrations of the vehicle in its travel and thus prevent these vibrations damaging the lamp or shattering the filament thereof.

I claim:

1. In a device of the class described, a bracket comprising spaced parallel forward and rear bars, each bar having upper and lower slots disposed longitudinally of the bar, a frame within said bracket, pins on said frame engaged in said slots, and equalizing springs tending to force said frame to the middle portion of said bracket.

2. In a device of the class described, a bracket comprising pairs of front and rear vertically disposed bars arranged in parallelism, each bar having a pair of slots therein disposed longitudinally of the bar, a frame, arms extending from said frame and between the front and rear bars and in engagement with the latter, pins on said arms engaged in said slots, the said arms each having a pair of openings therein, top and bottom members on said bracket disposed above and below said arms, posts extending from said top and bottom members and passing through said members, and coil springs encircling said posts and engaging said top and bottom members of said arms.

3. In a device of the class described, a plate, bars extending forwardly from the lower edges of said plate and from each end thereof, bracket bars connected to the outer ends of the first named bars and extending upwardly therefrom and extending rearwardly and connected to the said plate near its top, the plate and said bracket bar having slots therein, a frame movable in said bracket, pins on said frame engaged in said slots, and springs interposed between said frame and said bars and frame bars.

4. In a device of the class described, a bracket, upper and lower frame portions independent of each other and slidable in said bracket, means resisting movement of one of said portions in one direction and means resisting movement of the other portion in the opposite direction.

5. In a device of the class described, a bracket, upper and lower frame portions independent of each other and slidable in said bracket, means resisting movement of one of said portions in one direction and means resisting movement of the other portion in the opposite direction, and a lamp connecting said portions.

In testimony whereof I affix my signature hereto.

ARTHUR MOORE.